(12) United States Patent
Lee et al.

(10) Patent No.: US 8,417,297 B2
(45) Date of Patent: Apr. 9, 2013

(54) MOBILE TERMINAL AND METHOD OF PROVIDING GRAPHIC USER INTERFACE USING THE SAME

(75) Inventors: Khwanhee Lee, Seoul (KR); Woochul Song, Seoul (KR)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 12/569,355

(22) Filed: Sep. 29, 2009

(65) Prior Publication Data

US 2010/0298032 A1 Nov. 25, 2010

(30) Foreign Application Priority Data

May 22, 2009 (KR) .......................... 10-2009-0044915
Jul. 6, 2009 (KR) .......................... 10-2009-0061270

(51) Int. Cl.
*H04B 1/38* (2006.01)
(52) U.S. Cl. .................. 455/566; 455/575.1; 455/575.3; 455/550.1
(58) Field of Classification Search .................. 455/566, 455/575.1, 575.3, 550.1
See application file for complete search history.

(56) References Cited

U.S. PATENT DOCUMENTS

| | | | |
|---|---|---|---|
| 2004/0132499 A1* | 7/2004 | Abe | 455/566 |
| 2004/0185920 A1* | 9/2004 | Choi et al. | 455/575.1 |
| 2004/0212602 A1 | 10/2004 | Nako et al. | |
| 2006/0187142 A1* | 8/2006 | Lesniak | 345/1.1 |
| 2008/0125191 A1* | 5/2008 | Nordenskjold | 455/575.1 |
| 2009/0322650 A1* | 12/2009 | Kakie | 345/1.3 |

FOREIGN PATENT DOCUMENTS

| | | |
|---|---|---|
| EP | 2020807 | 2/2009 |
| EP | 2051485 | 4/2009 |
| WO | 2006/123211 | 11/2006 |

* cited by examiner

*Primary Examiner* — Nghi H Ly
(74) *Attorney, Agent, or Firm* — Lee, Hong, Degerman, Kang & Waimey

(57) ABSTRACT

Provided are a mobile terminal and a method of providing a graphic user interface using the same. The mobile terminal includes a plurality of bodies. Various graphic user interfaces are provided according to a posture of the mobile terminal, which is formed by the plurality of bodies of the mobile terminal.

16 Claims, 14 Drawing Sheets (a)

(b)

(a)

(b)

MOBILE TERMINAL AND METHOD OF PROVIDING GRAPHIC USER INTERFACE USING THE SAME

CROSS-REFERENCE TO RELATED APPLICATIONS

Pursuant to 35 U.S.C. §119(a), this application claims the benefit of earlier filing date and right of priority to Korean Patent Application Nos. 10-2009-0044915, filed on May 22, 2009, and 10-2009-0061270, filed on Jul. 6, 2009, the entire contents of which are all hereby incorporated by reference herein in their entirety.

BACKGROUND OF THE INVENTION

1. Field of the Invention

The present invention relates to a mobile terminal, and more particularly, to a mobile terminal having a plurality of bodies and providing various graphic user interfaces according to the angle between the plurality of bodies and a method of providing graphic user interfaces using the same.

2. Discussion of the Related Art

Mobile terminals having various functions and shapes come to the market as mobile terminal technology makes rapid progress. However, the size of a mobile terminal is restricted for portability. It is inconvenient for a user to operate the mobile terminal due to a restriction on the size of the display of the mobile terminal.

Accordingly, a variety of researches for solving the restriction on the mobile terminal size have been performed recently, and thus mobile terminals having various body structures come to the market.

SUMMARY OF THE INVENTION

Accordingly, one object of the present invention is to address the above-noted and other drawbacks of the related art.

Another object of the present invention is to provide a mobile terminal having a plurality of bodies and providing graphic user interfaces corresponding to postures of the mobile terminal, formed by the plurality of bodies, and a method of providing a graphic user interface using the same.

To accomplish the objects of the present invention, according to a first aspect of the present invention, there is provided a mobile terminal including a first body including a first touch screen; a second body including a second touch screen; a combining part combining the first body and the second body with each other such that the mobile terminal can be folded into the first and second bodies; a sensing unit sensing the posture of the mobile terminal, formed by the first and second bodies; a memory storing a plurality of graphic user interfaces including at least one object; and a controller configured to display a graphic user interface corresponding to the posture sensed by the sensing unit among the plurality of graphic user interfaces on the first or second touch screen.

To accomplish the objects of the present invention, according to a second aspect of the present invention, there is provided a mobile terminal including a first body including a first touch screen; a second body including a second touch screen; a combining part combining the first body and the second body with each other such that the mobile terminal can be folded into the first and second bodies; a sensing unit sensing the posture of the mobile terminal, formed by the first and second bodies; a memory storing a plurality of graphic user interfaces including at least one object; and a controller configured to display a graphic user interface corresponds to a posture change among the plurality of graphic user interfaces on the first or second touch screen when the posture sensed by the sensing unit is changed from a first posture to a second posture.

To accomplish the objects of the present invention, according to a third aspect of the present invention, there is provided a method of providing a graphic user interface in a mobile terminal having a first body and a second body combined with each other such that the mobile terminal can be folded into the first and second bodies, the method including sensing a change in a posture formed by the first and second bodies from a first posture to a second posture; and providing a graphic user interface including at least one object and corresponding to the second posture to at least one of a first touch screen included in the first body and a second touch screen included in the second body.

According to the mobile terminal and the method of providing a graphic user interface using the same, various graphic user interfaces can be provided according to shapes formed by the plurality of bodies and/or the posture of the mobile terminal, and thus a user can be provided with a required graphic user interface without performing an additional menu search operation.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates an open status of the mobile terminal in which the angle between first and second bodies 101 and 102 corresponds to a;

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
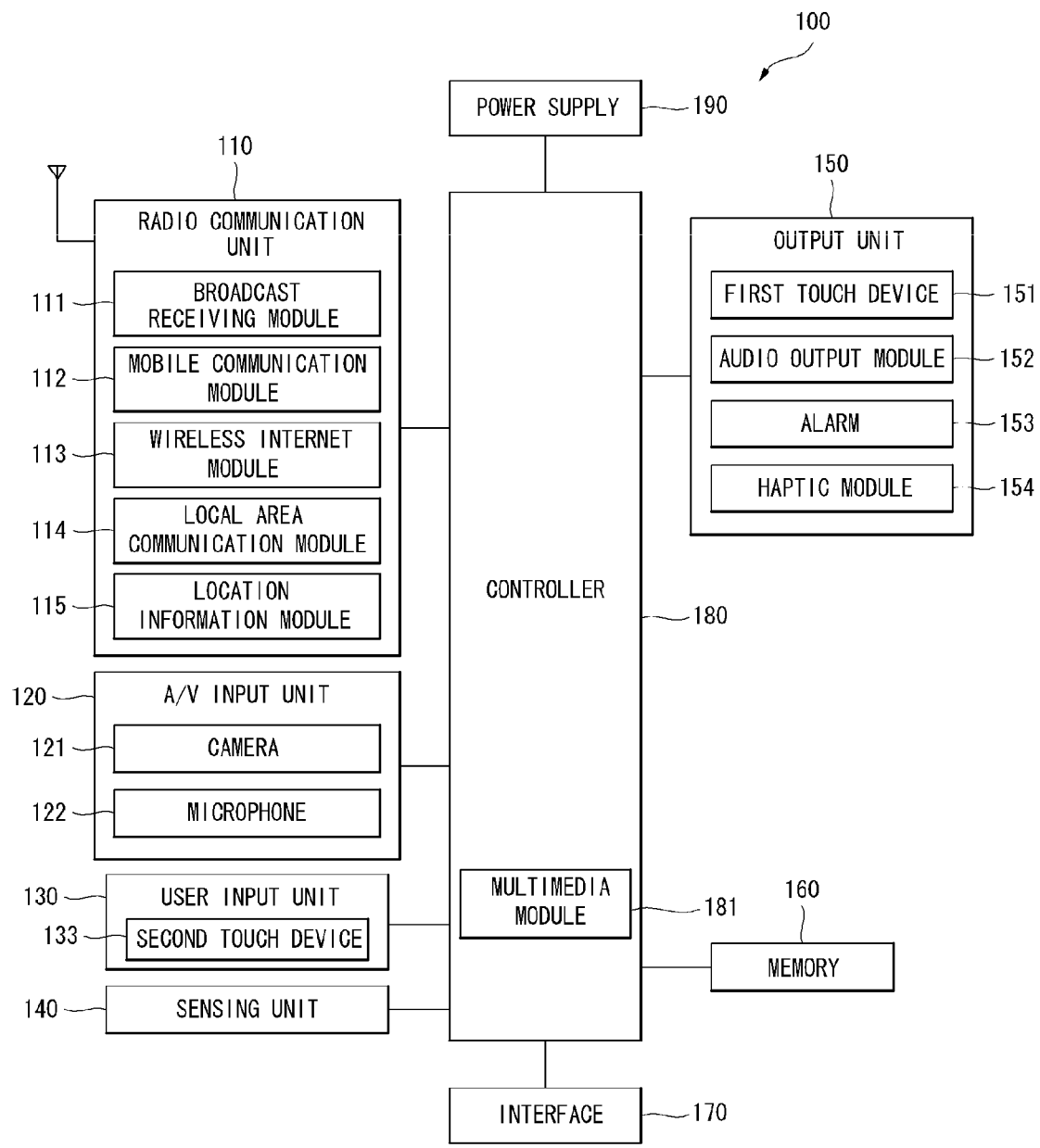
FIG. 1 is a block diagram of a mobile terminal according to an embodiment of the present invention.

FIG. 1 is a block diagram of a mobile terminal 100 according to an embodiment of the present invention. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190.

The radio communication unit 110 may include at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. The position information module 115 can obtain position information by using a global navigation satellite system (GNSS). The GNSS is a terminology describing radio navigation satellite systems that revolve round the earth and transmit reference signals to predetermined types of radio navigation receivers such that the radio navigation receivers can determine their positions on the earth's surface or near the earth's surface. The GNSS includes a global positioning system (GPS) of the United States, Galileo of Europe, global orbiting navigational satellite system (GLONASS) of Russia, COMPASS of China, quasi-zenith satellite system (QZSS) of Japan and so on.

In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras.

The microphone 122 receives an external audio signal in a call mode, a recording mode or a speech recognition mode and processes the received audio signal into electric audio data. The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen herein-after, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc. The audio output module 152 can output sounds through an earphone jack. The user can hear the sounds by connecting an earphone to the earphone jack.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Next, embodiments of the present invention will now be explained.

FIGS. 2, 3, 4A and 4B illustrates the external appearance of the mobile terminal 100 according to the embodiments of the present invention, which will be explained later. The mobile terminal 100 includes a first body 101 and a second body 102 which are combined with each other through a combining part 195.

The first body 101 and the second body can be combined with each other in various manners. For example, the combining part 195 can combine the first body 101 and the second body with each other in such a manner that the mobile terminal 100 is folded into the firs body 101 and the second body 102. Furthermore, the combining part 195 can combine the first body 101 and the second body 102 such that the first body 101 and the second body 102 can slide in opposite directions. While the first body 101 and the second body 102 are combined by the combining part 195 in such a manner that the mobile terminal 100 is folded into the first body 101 and the second body 102 in the embodiments of the present invention, the present invention is not limited thereto.

Figure 2:
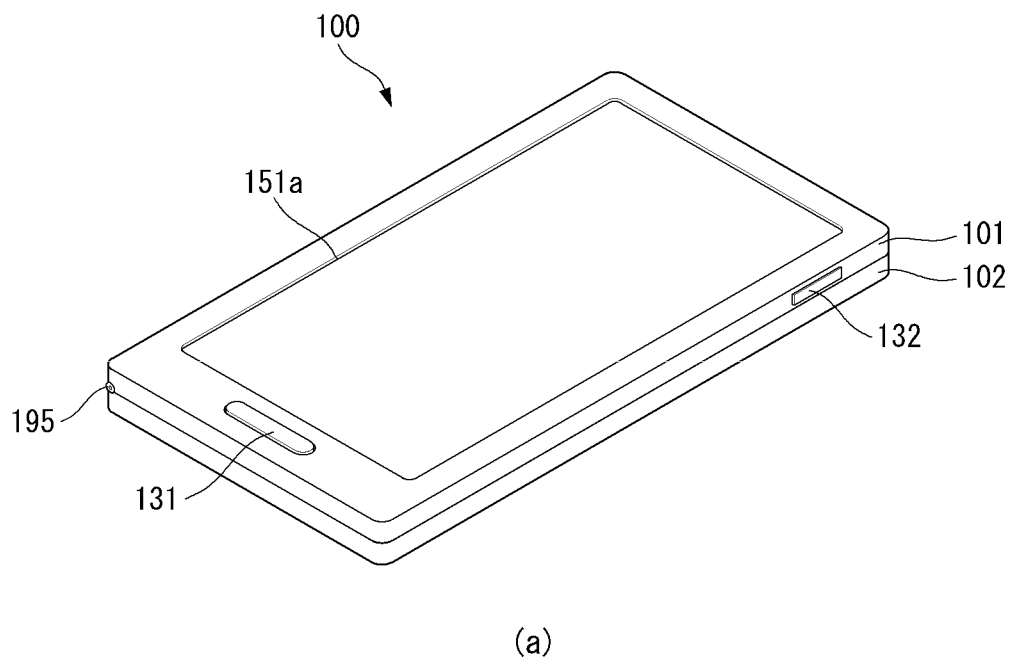
FIGS. 2, 3, 4A and 4B illustrate the external appearance of the mobile terminal according to embodiments of the present invention.
Figure 2:
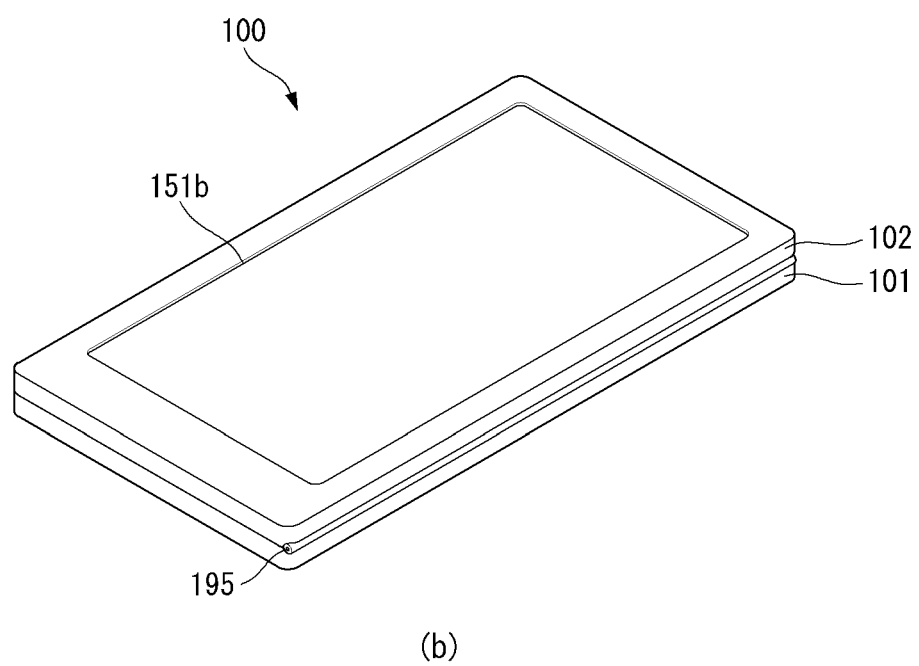
Figure 3:
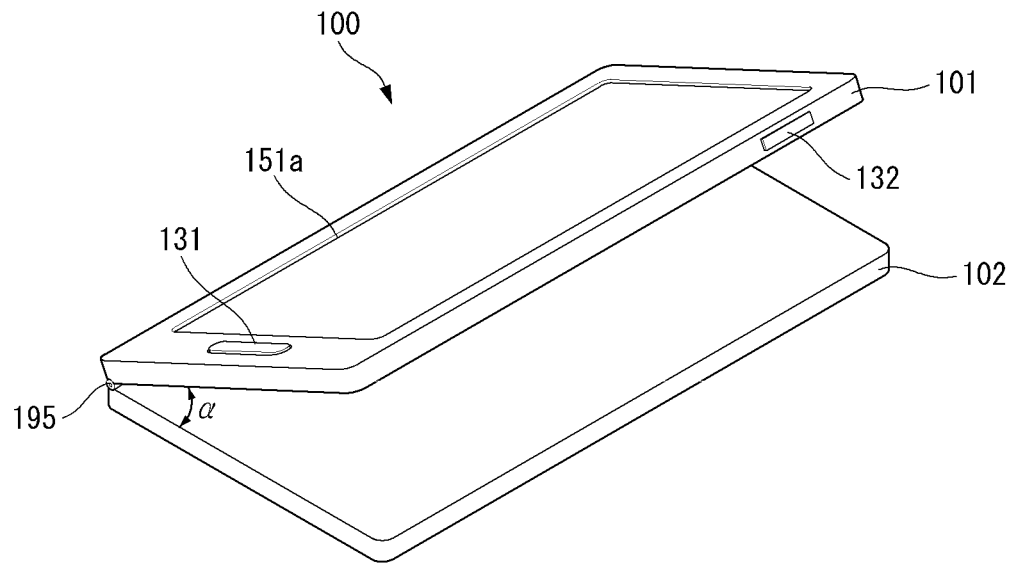
Figure 3:
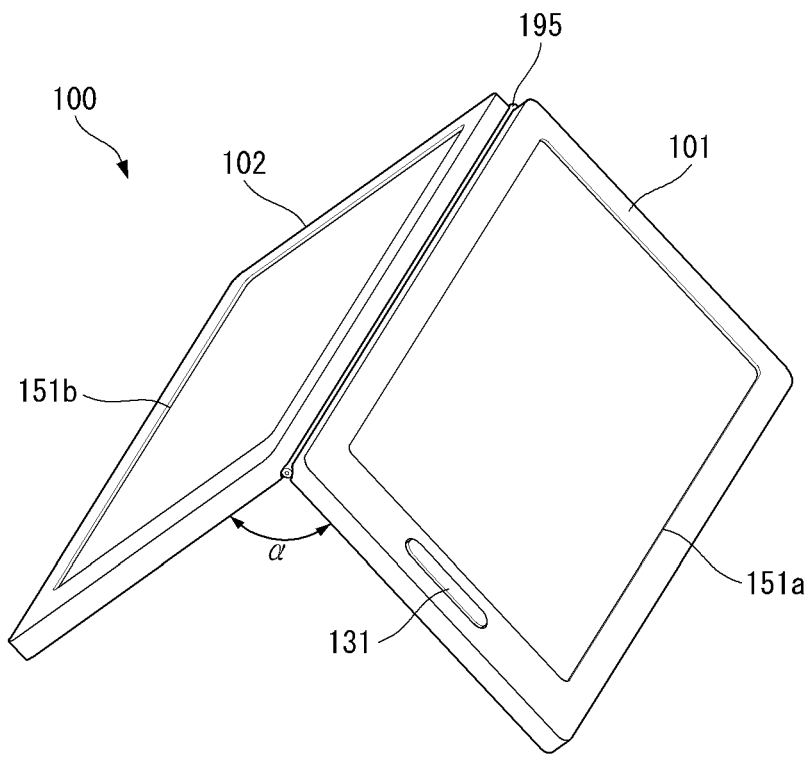
Figure 4A:
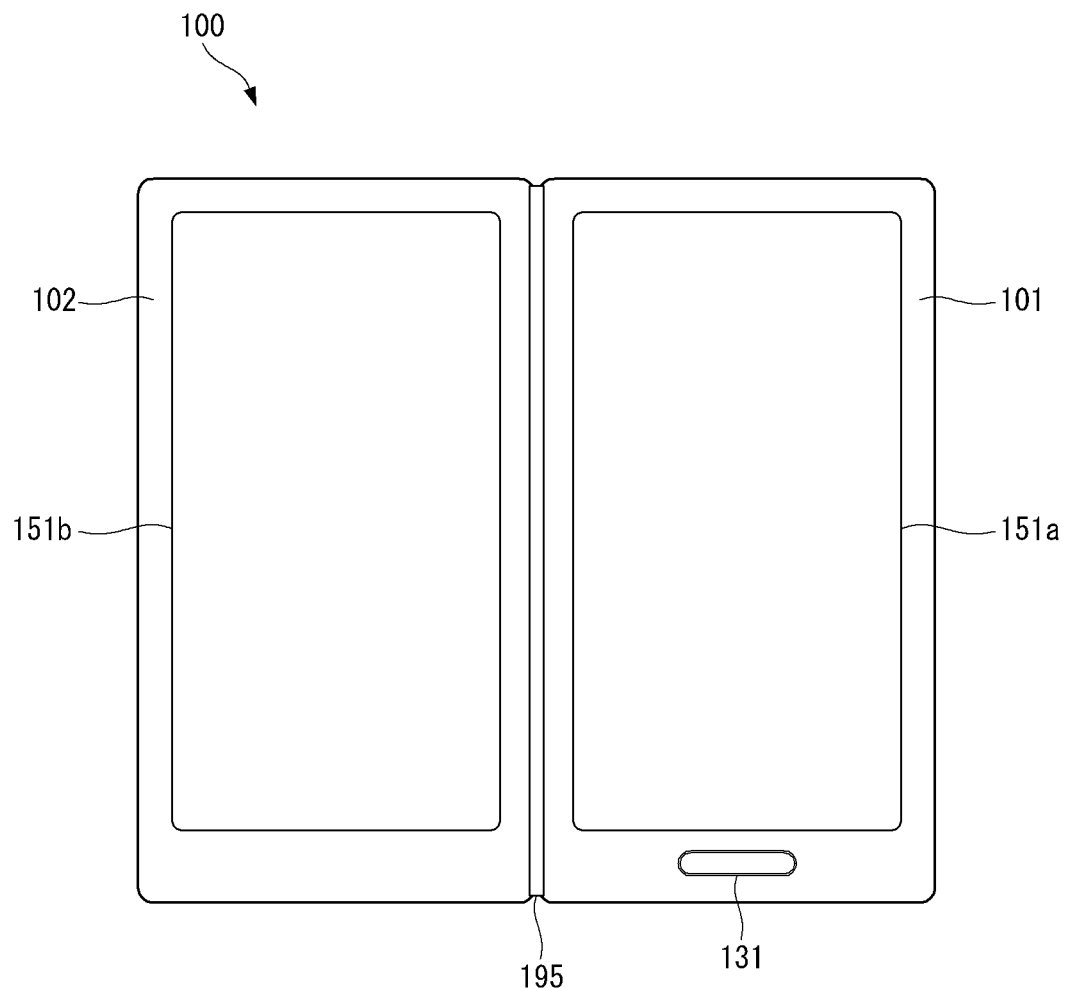
Figure 4B:
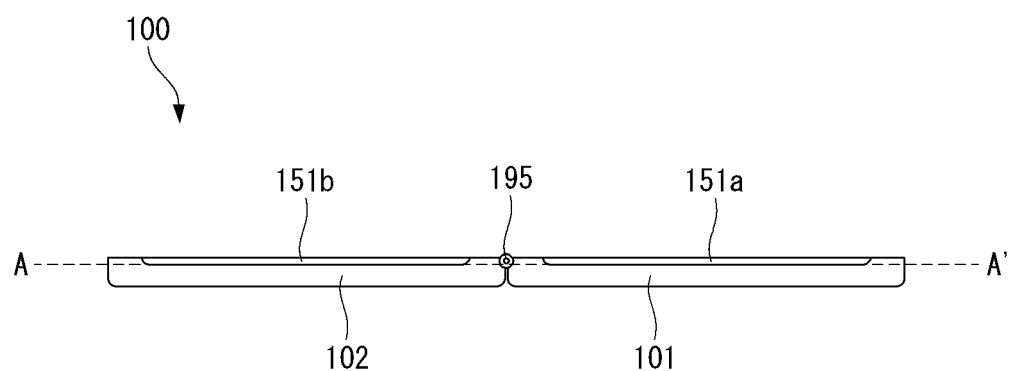

FIG. 2 is a perspective view showing the first body 101 and the second body 102 in a closed status, FIG. 3 is a perspective view showing the first body 101 and the second body 102 in a half open status, and FIGS. 4A and 4B are a front view and a side view showing the first body 101 and the second body 102 in a fully open status. The user can open and close the first body 101 and the second body 101, as illustrated in FIGS. 2, 3, 4A and 4B.

The first body 101 includes a first touch screen 151a and the second body 102 includes a second touch screen 151b. The first and second touch screens 151a and 151b can perform both an information inputting function and an information displaying function. The information inputting function can be implemented in a touching manner.

One side of the first body 101 to which the first touch screen 151a is attached and one side of the second body 102 to which the second touch screen 151b is attached do not come into contact with each other when the first and second bodies 101 and 102 are in the closed status. Referring to FIG. 2, the first and second touch screens 151a and 151b do not come into contact with each other when the first and second bodies 101 and 102 are in the closed status.

One side of the first body 101 to which the first touch screen 151a is attached and one side of the second body 102 to which the second touch screen 151b is attached can be located in the substantially same plane when the first and second bodies 101 and 102 are in the fully open status. Referring to FIG. 4B, the first and second touch screens 151a and can be arranged in the substantially same plane when the first and second bodies 101 and 102 are in the fully open status.

The operation of folding the mobile terminal 100 into the first body 101 and the second body 102 is not limited to the example shown in FIGS. 4A and 4B. For example, the angle α between the first and second bodies 101 and 102 can be in the range of 0 to 180°, as shown in FIGS. 2, 3, 4A and 4B. Furthermore, the first and second bodies 101 and 102 can be combined by the combining part 195 such that the angle α between the first and second bodies 101 and 102 becomes greater than 180°.

The controller 180 can sense the open/closed status of the first and second bodies 101 and 102 and the angle α between the first and second bodies 101 and 102 by using the aforementioned sensing unit 140. Furthermore, the controller 180 can sense the direction of the first touch screen 151a and/or second touch screen 151b by using the sensing unit 140. Referring to FIG. 4A, the mobile terminal 100 can be placed on a desk such that the first and second touch screens 151a and 151b face the ground or opposite direction when the angle α between the first and second bodies 101 and 102 is 180°. The controller 180 can sense the position or direction of the mobile terminal 100.

The sensing unit 140 can include at least one of a hall sensor, 3-axis or 6-axis motion sensor, terrestrial magnetic sensor and acceleration sensor in order to sense the position or direction of the mobile terminal 100.

Furthermore, the mobile terminal 100 may include at least one of a first operating part 131 and a second operating part 132, as shown in FIGS. 2, 3, 4A and 4B. The first and second operating parts 131 and 132 are operating units included in the user input unit 130 and correspond to the aforementioned key pad.

The mobile terminal 100 can receive a command for controlling the operation of the mobile terminal 100 through at least one of the first and second operating parts 131 and 132. Commands input through the first and second operating parts 131 and 132 can be set in various manners. For example, commands such as start, finish and scroll can be input through the first operating part 131 and a command for adjusting the volume of sound output from the audio output unit 152 and a command for converting the display unit 151 into the touch recognition mode can be input through the second operating part 132.

Figure 5:
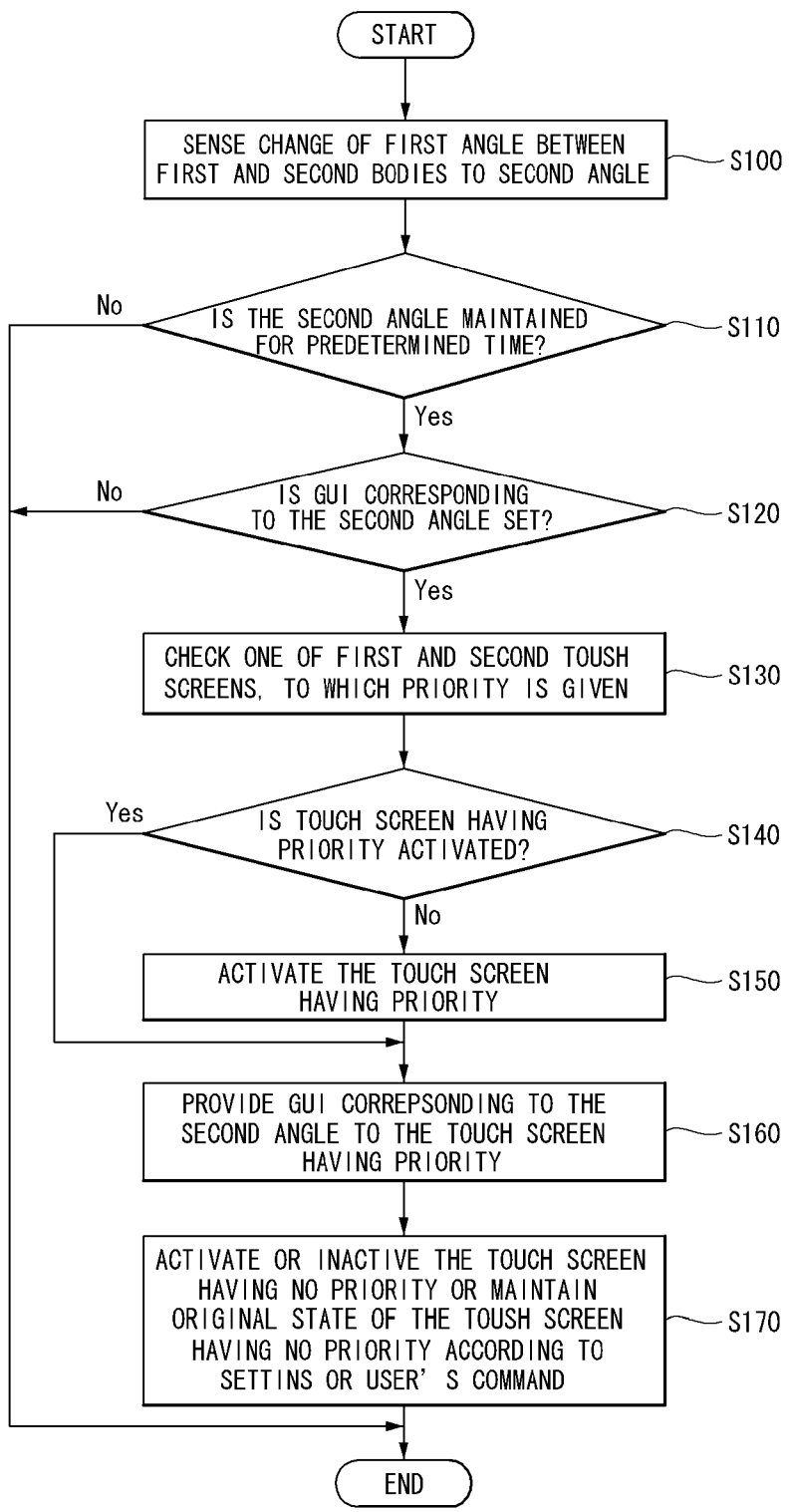
FIG. 5 is a flowchart of a method of providing a graphic user interface according to an embodiment of the present invention.

FIG. 5 is a flowchart of a method of providing a graphic user interface (GUI) of a mobile terminal.

The method of providing a GUI of a mobile terminal according to an embodiment of the present invention can be implemented in the mobile terminal 100 above-described with reference to FIGS. 1 through 4B. The method of providing a GUI of a mobile terminal according to an embodiment of the present invention and the operation of the mobile terminal 100 for implementing the method will now be explained.

The controller 180 may detect a change in the posture of the mobile terminal 100, formed by the first and second bodies 101 and 102, from a first posture to a second posture.

For example, the posture formed by the first and second bodies 101 and 102 may be an angle between the first and second bodies 101 and 102 or a relative position of the first body 101 with respect to the second body 102.

The sensing unit 140 may sense the angle between the first and second bodies 101 and 102 or the relative position of the first body 101 with respect to the second body 102 and transmit information on the sensed angle or relative position to the controller 180.

Embodiments of the present invention will now be explained on the assumption that the posture formed by the first and second bodies corresponds to the angle between the first and second bodies 101 and 102.

For example, the controller 180 detects a change in the angle α between the first and second bodies 101 and 102 from a first angle to a second angle in step S100.

Figure 6:
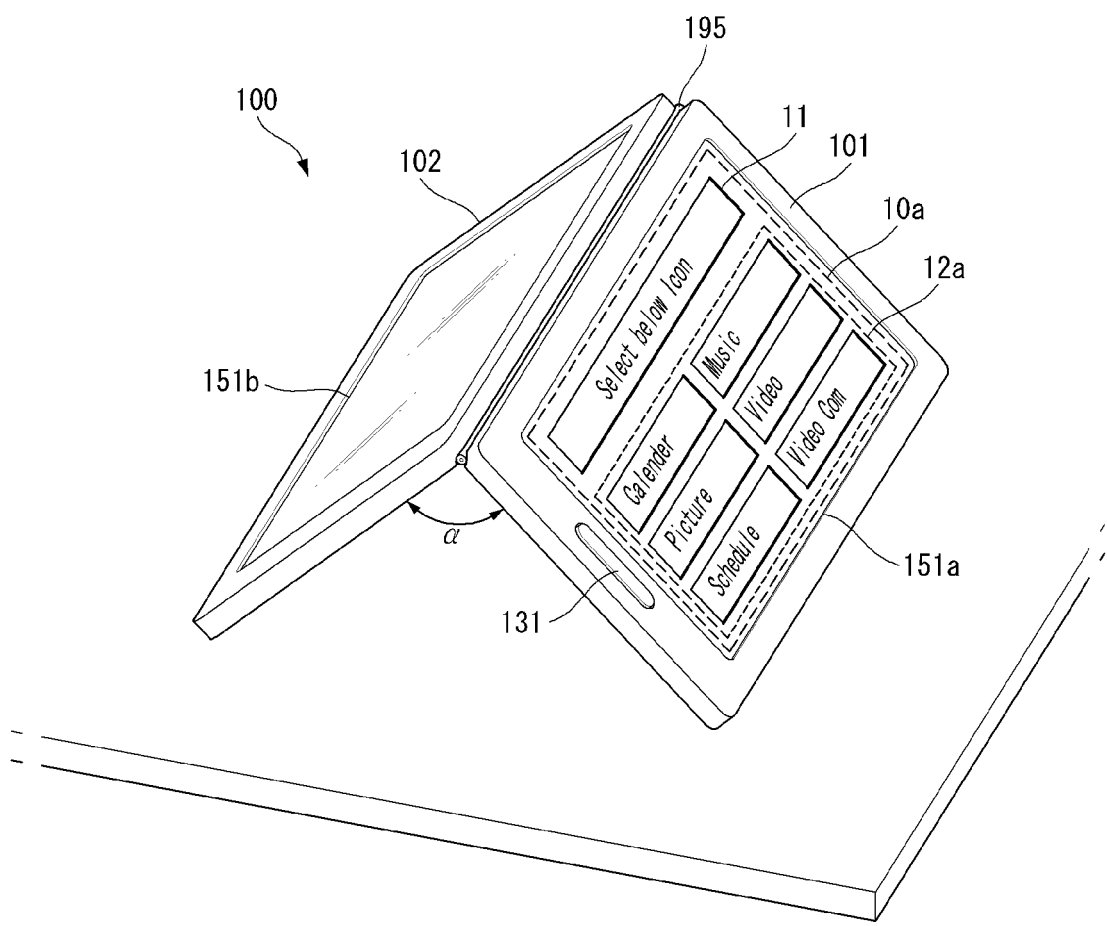

FIG. 6 illustrates an open status of the mobile terminal 100, in which the angle α between the first and second bodies 101 is α. FIG. 6 shows that the mobile terminal 100 is placed on a desk. Here, the angle α corresponds to the second angle.

The controller 180 determines whether the second angle is maintained for a predetermined time in step S110. When the second angle is maintained for the predetermined time, the controller 180 determines whether a GUI corresponding to the second angle is set in step S120.

The GUI may include at least one of objects including icons or menus corresponding to files, contents and applications. The at least one object may include a graphic element and be visually provided.

The controller 180 checks one of the first and second touch screens 151a and 151b, to which priority is given, when the GUI corresponding to the second angle is set in step S130.

The controller 180 may give one of the first and second touch screens 151a and 151b the priority according to various standards. For example, the controller 180 may give the priority to the first touch screen 151a. That is, the controller 180 can give priority to the first touch screen 151a as long as a specific event does not occur.

Furthermore, the controller 180 may give the priority to one of the first and second touch screens 151a and 151b in consideration of the absolute positions/relative positions of the first and second bodies 101 and 102. For example, the controller 180 may give the priority to the second touch screen 151b when the first touch screen 151a included in the first body 101 faces the ground while the first and second bodies 101 and 102 are in the open status (refer to FIG. 11).

Figure 10:
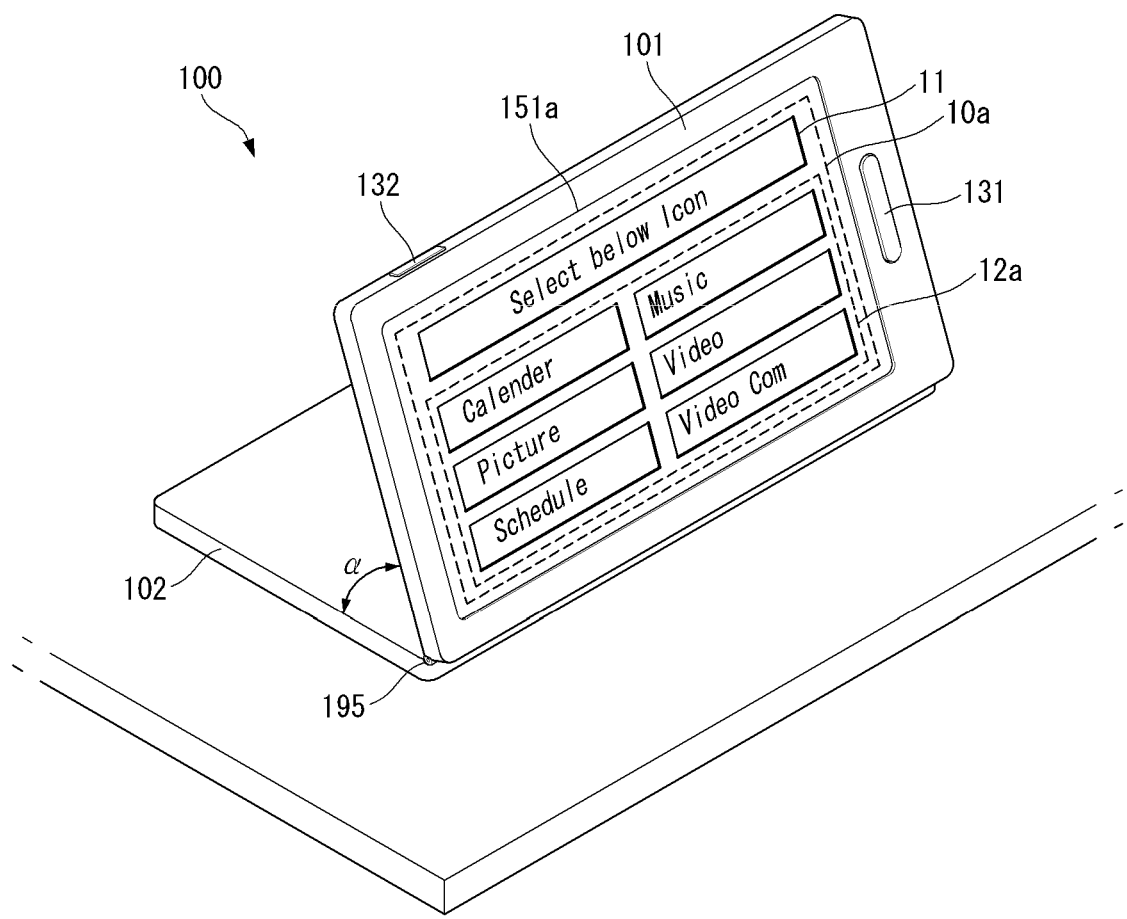
FIGS. 10 and 11 illustrate a change of a touch screen having priority according to the posture of the mobile terminal.

Moreover, the controller 180 may give the priority to one of the first and second touch screens 151a and 151b in consideration of the directions of the first and second touch screens 151a and 151b. In FIG. 10, for example, the first touch screen 151a can be given the priority since the second touch screen 151b faces the ground. Furthermore, the second touch screen 151b can be given the priority because the first touch screen 151a faces the ground in FIG. 11.

In addition, the controller 180 may give the priority to at least one of the first and second touch screens 151a and 151b in consideration of the angle α between the first and second bodies 101 and 102. For example, the controller 180 can give the priority to the first touch screen 151a when the angle α between the first and second bodies 101 and 102 is in the range of 0° to 30°. Furthermore, the controller 180 can give the priority to the second touch screen 151b when the angle α between the first and second bodies 101 and 102 is in the range of 60° to 120°.

The controller 180 may give the priority to both the first and second touch screens 151a and 151b, which will be described later. In this case, the controller 180 may provide GUIs respectively corresponding to the first and second touch screens 151a and 151b.

Moreover, the controller 180 may give the priority to one of the first and second touch screens 151a and 151b, which is currently activated. For example, the controller 180 can give the priority to the second touch screen 151b if the first touch screen 151a is inactivated and the second touch screen 151b is activated.

Furthermore, the controller 180 may give the priority to one of the first and second touch screens 151a and 151b in consideration of currently displayed information. For example, the controller 180 can give the priority to the second touch screen 151b when video contents included in the currently received broadcasting signal are displayed on the first touch screen 151a.

The controller 180 determines whether one of the first and second touch screens 151a and 151b, to which the priority is given, is activated in step S140. When it is determined that the touch screen having the priority is activated, the controller 180 provides the GUI corresponding to the second angle to the touch screen having the priority in step S160.

When it is determined that the touch screen having the priority is inactivated in step S140, the controller 180 activates the touch screen having the priority in step S150 and provides the GUI corresponding to the second angle to the activated touch screen in step S160.

Referring to FIG. 6, the controller 180 displays a GUI 10a corresponding to the current angle α between the first and second bodies 101 and 102 on the first touch screen 151a. The GUI 10a may include various information items. For example, the GUI 10a may include information 11 for inducing a user to perform a predetermined operation and a selection region 12a including at least one icon or menu for selecting an application according to touch.

Figure 7:
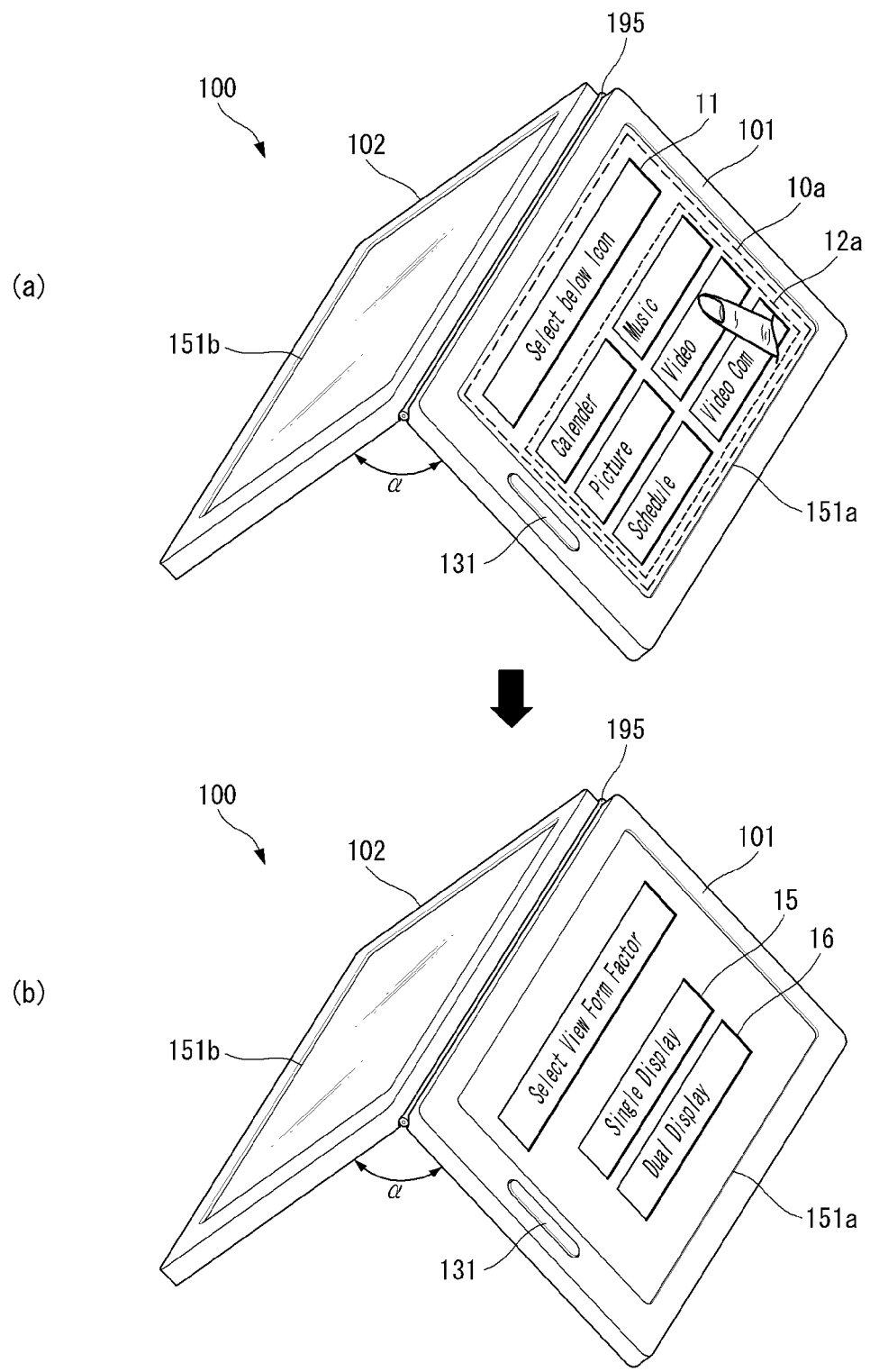
FIGS. 7 and 8 illustrate exemplary images displayed on the mobile terminal when an application corresponding to a specific menu selected in the state shown in FIG. 6 is executed.
Figure 8:
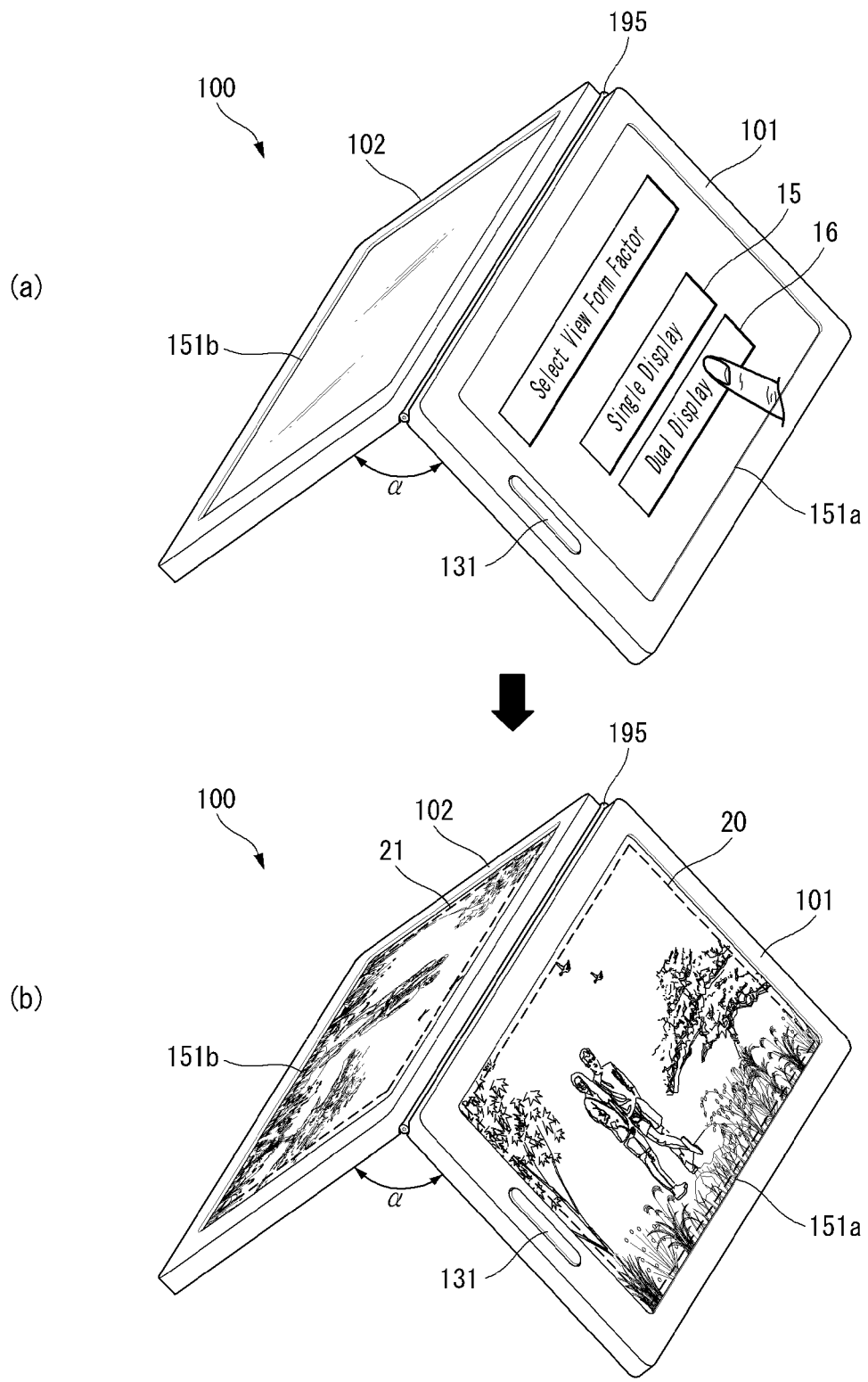

FIGS. 7 and 8 illustrate exemplary images displayed on the mobile terminal 100 when an application corresponding to a specific menu selected in the state shown in FIG. 6.

Referring to FIG. 7(a), the user may touch a menu "video" in the selection region 12a with his/her finger. The menu "video" may correspond to a video application providing a video file reproducing function.

Referring to FIG. 7(b), the controller 180 may display user interfaces 15 and 16 for selecting a view form factor on the first touch screen 151a when the user selects the menu "video". Reference numeral 15 denotes a first user interface for receiving an instruction to execute the video application by using only one of the first and second touch screens 151a and 151b and reference numeral 16 denotes a second user interface for receiving an instruction to execute the video application by using both the first and second touch screens 151a and 151b.

Referring to FIG. 8(a), when the user touches the second user interface 16, the controller 180 may execute the video application by using both the first and second touch screens 151a and 151b. FIG. 8(b) shows that the same video contents are played on the first and second touch screens 151a and 151b. Accordingly, multiple users can view the same video contents through the first and second touch screens 151a and 151b from different angles corresponding to the directions of the first and second touch screens 151a and 151b.

Figure 9A:
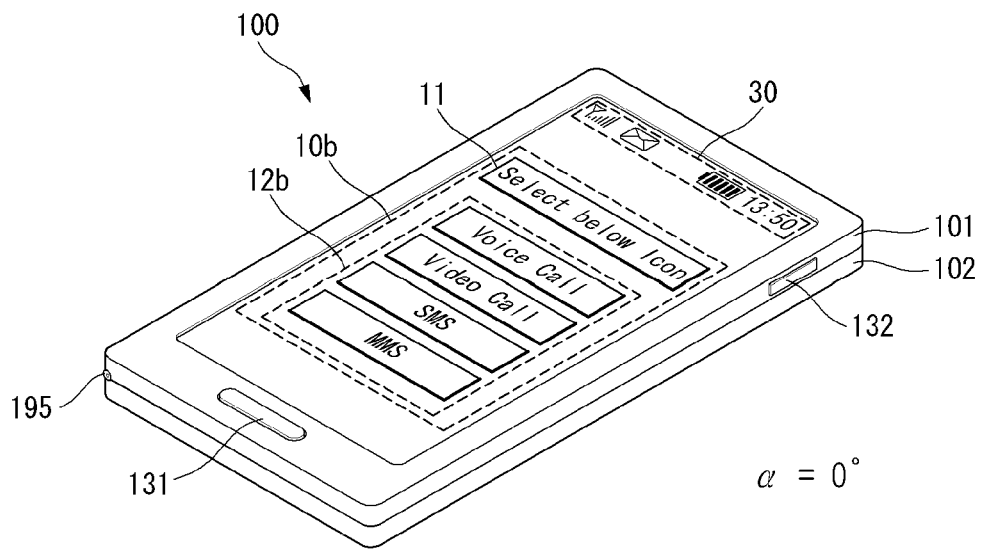
FIGS. 9A and 9B illustrate exemplary images displayed on the mobile terminal when graphic user interfaces according to the angle between the first and second bodies 101 and 102 are provided.
Figure 9B:
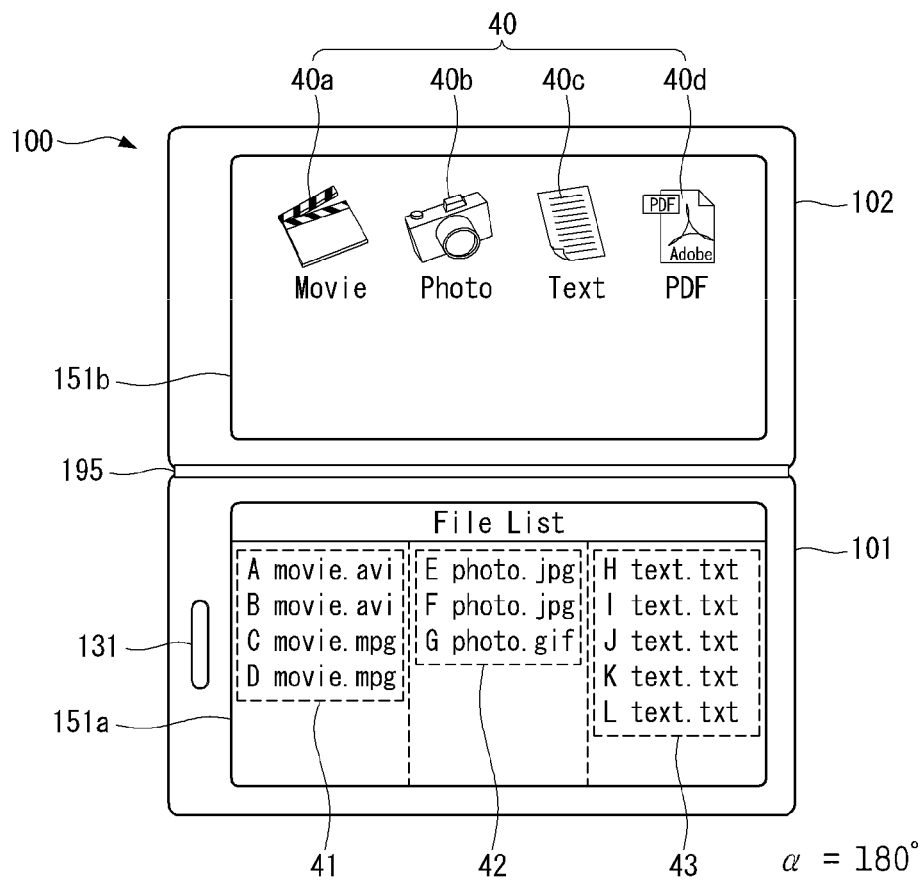

FIGS. 9A and 9B illustrate exemplary images displayed on the mobile terminal 100 when GUIs based on the angle between the first and second bodies 101 and 102 are provided.

FIG. 9A shows a GUI 10b provided when the first and second bodies 101 and 102 are in the closed status in which the angle between the first and second bodies 101 and 102 corresponds to 0°. The GUI 10b may include the information 11 for inducting the user to perform the predetermined operation and a selection region 12b including at least one icon or menu for selecting a communication application according to touch. For example, the selection region 12b may include a plurality of icons or menus respectively corresponding to a voice call application, a video call application, a short message service (SMS) application and a multimedia messaging service (MMS) application.

FIG. 9B shows GUIs provided when the first and second bodies 101 and 102 are in the fully open status in which the angle between the first and second bodies 101 and 102 corresponds to 180°. In FIG. 9B, GUIs corresponding to the first and second touch screens 151a and 151b are provided. For example, the controller 180 may display file lists 41, 42 and 43 on the first touch screen 151a and display icons or menus 40 corresponding to applications for outputting or reproducing multimedia contents on the second touch screen 151b.

As described above, various GUIS may respectively correspond to postures of the mobile terminal 100, which are formed by the first and second bodies 101 and 102. Furthermore, the GUIs respectively corresponding to various postures formed by the first and second bodies 101 and 102 may be set by the user.

For example, the mobile terminal 100 may be set such that the GUI 10b shown in FIG. 9A is provided if the first and second bodies 101 and 102 are in the closed status because the user frequently uses communication associated applications when the first and second bodies 101 and 102 are in the closed status.

Furthermore, the mobile terminal 100 may be set such that files lists and application icons related to multimedia contents are provided, as shown in FIG. 9B, if the angle between the first and second bodies 101 and 102 corresponds to 180° because the user frequently uses applications for outputting or reproducing multimedia contents when the first and second bodies 101 and 102 are in the fully open status.

In the above-described embodiments, the angle between the first and second bodies 101 and 102, which corresponds to a specific GUI, may be a predetermined angle range. In FIG. 9B, for example, the angle between the first and second bodies 101 and 102 does not correspond to exact 180°. That is, the controller 180 may provide the GUI shown in FIG. 9B when the angle between the first and second bodies 101 and 102 is in the range of 160° to 180° (or 200°).

Furthermore, the controller 180 may provide the GUI shown in FIG. 6 when the angle between the first and second bodies 101 and 102 is in the range of 30° to 60°.

Figure 11:
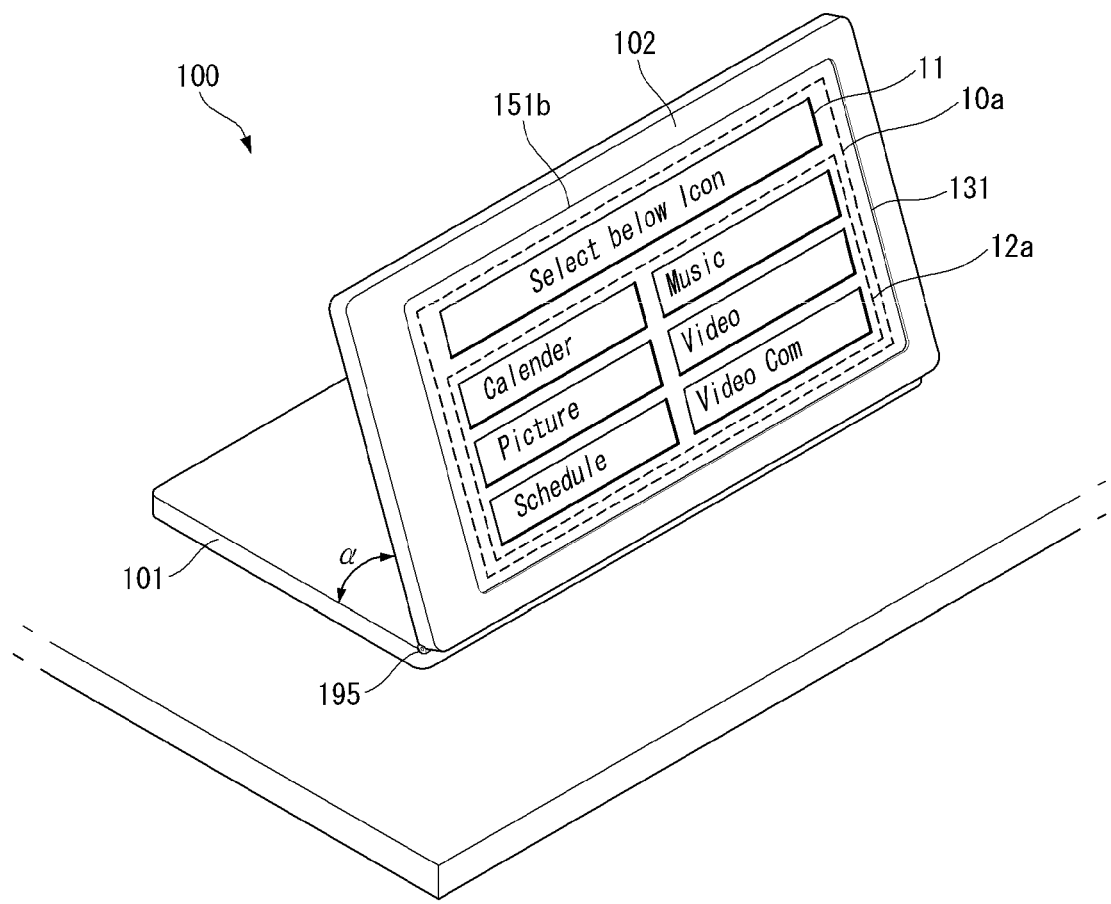

FIGS. 10 and 11 illustrate a change of a touch screen having the priority according to the posture formed by the first and second bodies 101 and 102 or the directions of the first and second touch screens 151a and 151b.

The controller 180 may activate or inactive one of the first and second touch screens 151 and 151b, to which the priority is not given, or maintain the original state of the touch screen having no priority according to a user's command or predetermined settings in step S170.

For example, when the user selects "dual display" while the second touch screen 151b is inactivated, as shown in FIG. 8(a), the second touch screen 151b having no priority is activated.

As described above, the first and second bodies 101 and 102 of the mobile terminal 100 can be opened and closed at various angles. The inner sides of the first and second bodies 101 and 102 face each other in a closed state. The first and second bodies 101 and 102 form an angle α in the range of 20° to 30° based on the combining part 195 in a closed state. The first and second bodies 101 and 102 form an angle α in the range of 60° to 120° based on the combining part 195 in a half open state. The first and second bodies 101 and 102 form an angle α in the range of 150° to 185° based on the combining part 195 in a fully open state. The controller 180 may respectively execute different graphic user interfaces (GUIs) in the closed state, half open state and fully open state.

The sensing unit 140 of the mobile terminal 100 includes a plurality of sensor pairs capable of respectively sensing the closed state, half open state and fully open state. Each of the sensor pairs includes a sensed element and a sensing element. The sensing element senses whether the sensed element is close to the sensing element and a distance between the sensed element and the sensing element through a variation in electrical properties, such as resistance, capacitance, inductance, etc. when the distance between the sensed element and the sensing element varies. The sensed element and the sensing element may be selected according to sensor type in various manners. In the case of an optical sensor, for example, a light-emitting element may be used as the sensed element and a light-receiving element may be used as the sensing element. Furthermore, a magnet may be used as the sensed element and a hall sensor may be used as the sensing element. The hall sensor outputs a voltage varying with a magnetic field by using hall effect. The hall sensor may be replaced by a hall IC (Integrated Circuit), a magnetoresistive element, etc. Sensors which can be used as the sensor pairs are not limited to the optical sensor and the hall sensor and any sensor including a sensed element and a sensing element can be used as the sensor pairs.

Sensing elements 11, 21, 31, 32 and 33 of the sensor pairs are arranged at predetermined intervals in the first body 101 and sensed elements 12, 22, 41, 42 and 43 of the sensor pairs are arranged at predetermined intervals in the second body 102, as described in FIGS. 12 through 19. The sensing elements 11, 21, 31, 32 and 33 may be included in the second body 102 and the sensed element 12, 22, 41, 42 and 43 may be set in the first body 101.

The sensing unit 140 converts analog output signals of the sensing elements into digital signals and generates logic high or low output signals. The controller 180 determines the extent of relative movement of the first body 101 and the second body 102 according to a logic high/low output signal input from the sensing unit 140 to recognize a closed state, half open state or fully open state of the folder type or slide type mobile terminal and executes a predetermined GUI according to each of the closed state, half open state and fully open state. Furthermore, the controller 180 may sense a rotating angle varying according to rotation of one of the first body 101 and the second body 102 to recognize a closed state, half open state and fully open state of the swivel type mobile terminal and execute a predetermined GUI according to each state.

FIGS. 12, 13, 14 and 15 are cross-sectional views of hall sensors included in the mobile terminal 100 according to an embodiment of the present invention.

First and second hall sensors 11 and 21 are arranged at a predetermined distance from each other and included in the first body 101 of the mobile terminal 100. The first hall sensor 11 is arranged at one end of the first body 101 and the second hall sensor 21 is located at the other end of the first body 101.

First and second magnets 12 and 22 are arranged at predetermined distance from each other in the second body 102 of the mobile terminal 100. The first magnet 12 is arranged at one end of the second body 102 and the second magnet 22 is located at the other end of the second body 102. The other end of the first body and the other end of the second body 202 correspond to the combining part 195. A distance h2 between the second hall sensor 21 and the second magnet 22 is greater than a distance h1 between the first hall sensor 11 and the first magnet 12 when the first and second bodies 101 and 102 are in the closed state.

Figure 15:
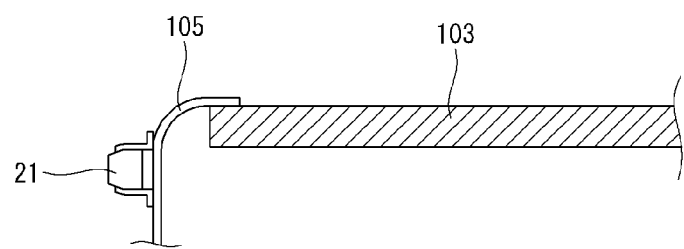
FIG. 15 is a cross-sectional view of a sensor element mounted on an FPCB.

The first and second hall sensors 11 and 21 may be mounted on a first printed circuit board (PCB) 103 or at least one of the first and second hall sensors 11 and 21 may be mounted on a flexible PCB (FPCB) 105 as illustrated in FIG. 15. The first and second magnets 21 and 22 may be bonded to a second PCB 104 included in the second body 102 or bonded to the inner face of the case of the second body 102.

The first and second hall sensors 11 and 21 generate output signals according to the angle α between the first and second bodies 101 and 102, as represented in Table 1. The output signals of the hall sensors 11 and 21 are not limited to logic values of Table 1 and can have other logic values if different types of hall sensors or hall ICs are employed.

TABLE 1

| Angle (α) | First hall sensor | Second hall sensor |
| --- | --- | --- |
| 0° | L | H |
| 45° | H | H |
| 180° | H | L |

Figure 12:
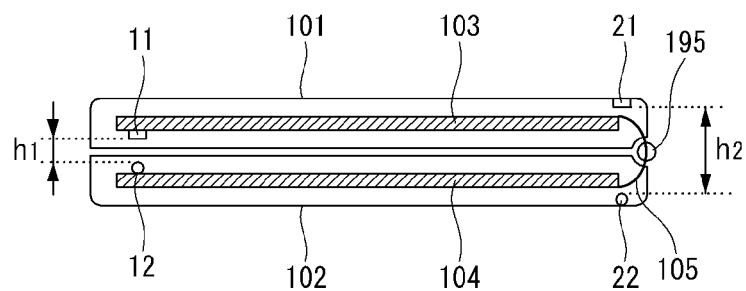
FIGS. 12, 13 and 14 are cross-sectional views of sensor elements and sensed objects according to a first embodiment of the present invention.

As illustrated in FIG. 12, the first hall sensor 11 and the first magnet 12 face each other having the distance h1 between them and the second hall sensor 21 and the second magnet 22 face each other having the distance h2 between them when the angle α between the first and second bodies 101 and 102 corresponds to 0°. Referring to Table 1, the first hall sensor 11 generates a logic low output signal L while the second hall sensor generates a logic high output signal H in the closed state, as illustrated in FIG. 12.

Figure 13:
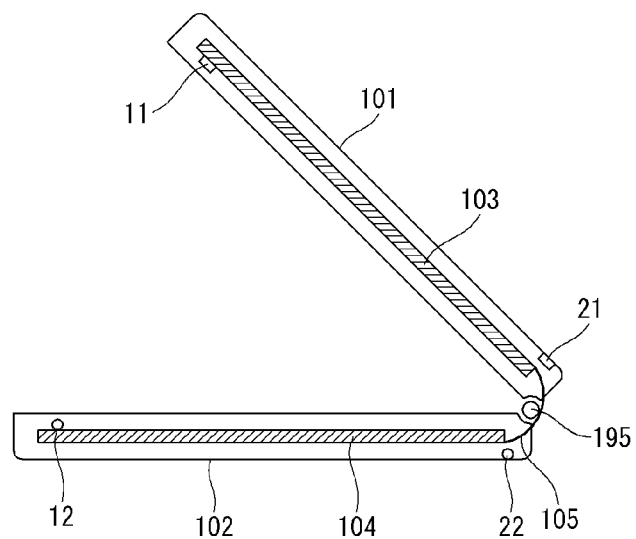

When the angle α between the first and second bodies 101 and 102 becomes 45° in a half open state, as illustrated in FIG. 13, the distance between the first hall sensor 11 and the first magnet 12 increases while the distance between the second hall sensor 21 and the second magnet 22 is hardly changed because the second hall sensor 21 and the second magnet 22 are located near the axis of rotation of the first and second bodies 101 and 102. Accordingly, the first and second hall sensors 11 and 21 generate a logic high output signal H in the half open state illustrated in FIG. 13, as represented in Table 1.

Figure 14:
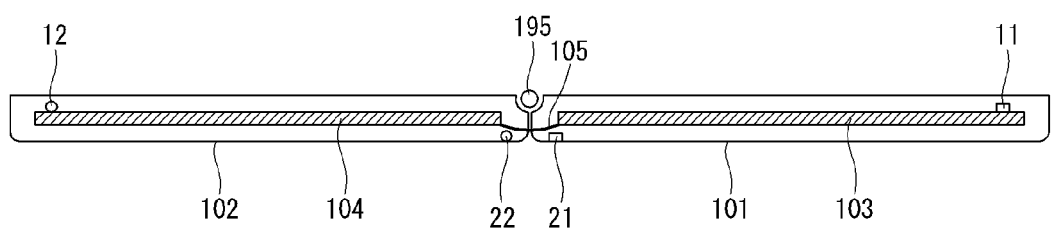

When the angle α between the first and second bodies 101 and 102 becomes 185° in a fully open state, as illustrated in FIG. 14, the distance between the first hall sensor 11 and the first magnet 12 further increases while the distance between the second hall sensor 21 and the second magnet 22 decreases. Accordingly, the first and second hall sensors 11 and 21 generate a logic low output signal L in the half open state illustrated in FIG. 14, as represented in Table 1.

The controller 180 may execute a predetermined GUI according to the angle between the first and second bodies 101 and 102 in response to the output signals of the first and second hall sensors 11 and 21, which depend on a variation in the angle between the first and second bodies 101 and 102, as illustrated in FIGS. 12, 13 and 14.

Figure 16:
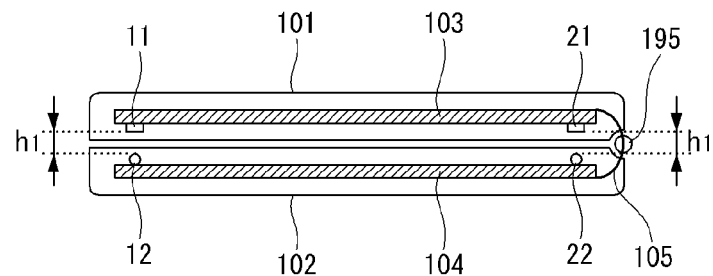
FIGS. 16, 17 and 18 are cross-sectional views of sensor elements and sensed objects according to a second embodiment of the present invention.
Figure 17:
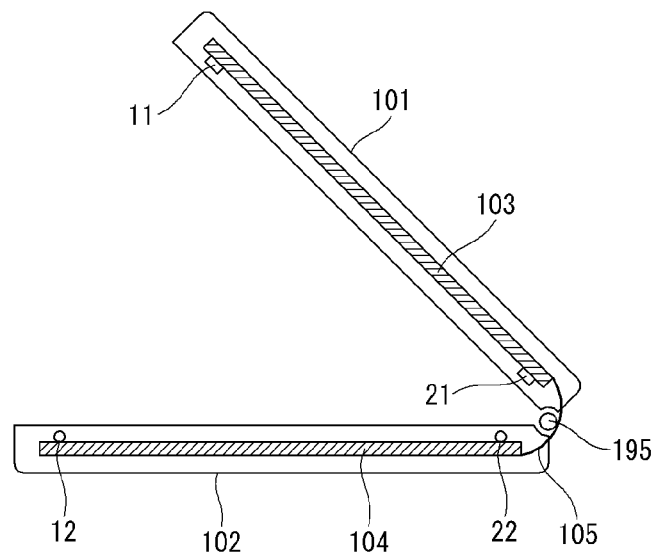
Figure 18:
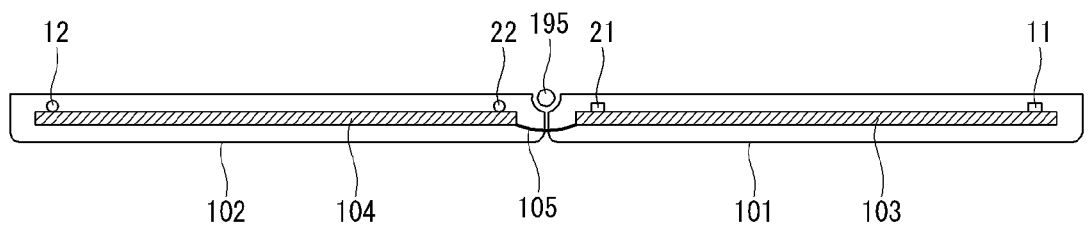
Figure 19A:
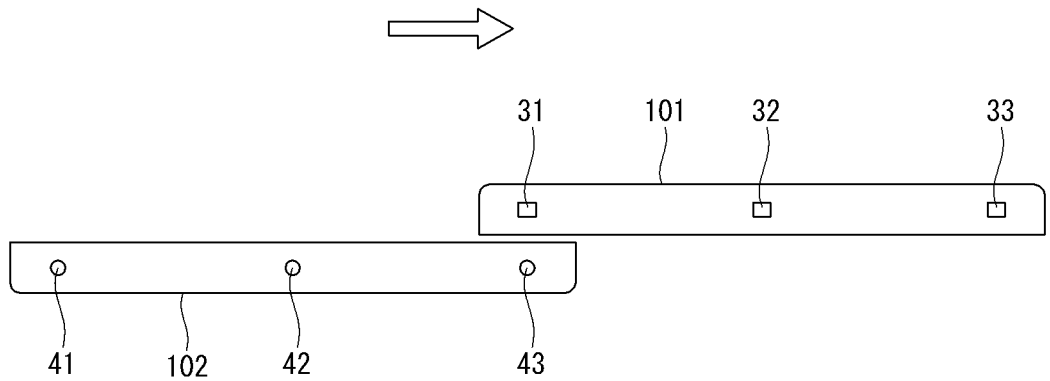
FIGS. 19A, 19B and 19C are cross-sectional views of sensor elements and sensed objects according to a third embodiment of the present invention.
Figure 19B:
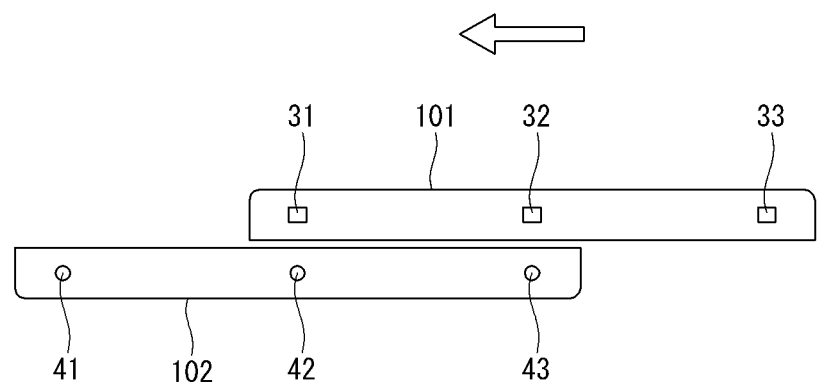
Figure 19C:
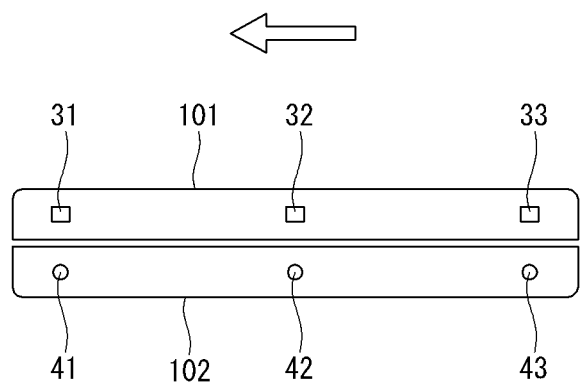

FIGS. 16, 17 and 18 are cross-sectional views of hall sensors included in the mobile terminal 100 according to another embodiment of the present invention.

The distance h1 between the second hall sensor 21 and the second magnet 22 is identical or similar to the distance h1 between the first hall sensor 11 and the first magnet 12 in the closed state of the mobile terminal 100 illustrated in FIGS. 16, 17 and 18. The first and second hall sensors 11 and 21 may be mounted on the first PCB 103 included in the first body 101 or at least one of the first and second hall sensors 11 and 12 may be mounted on the FPCB 105. The first and second magnets 21 and 22 may be bonded to the second PCB 104 included in the second body 102 or bonded to the inner face of the case of the second body 102.

In the mobile terminal 100 illustrated in FIGS. 16, 17 and 18, the first and second hall sensors 11 and 21 generate output signals as represented in Table 2 according to the angle α between the first and second bodies 101 and 102. The output signals of the hall sensors 11 and 21 are not limited to logic values of Table 2 and may be have different logic values if different types of hall sensors or hall ICs are employed.

TABLE 2

| Angle (α) | First hall sensor | Second hall sensor |
|---|---|---|
| 0° | L | L |
| 45° | H | L |
| 180° | H | H |

When the angle α between the first and second bodies 101 and 102 corresponds to 0° in a closed state, as illustrated in FIG. 16, the first and second hall sensors 11 and 12 are respectively close to the first and second magnets 12 and 22, and thus the first and second hall sensors 11 and 12 generate a logic low output signal L.

When the angle α between the first and second bodies 101 and 102 becomes 45° in a half open state, as illustrated in FIG. 17, the distance between the first hall sensor 11 and the first magnet 12 increases while the distance between the second hall sensor 21 and the second magnet 22 is barely changed because the second hall sensor 21 and the second magnet 22 are located near the axis of rotation of the first and second bodies 101 and 102. Accordingly, the first hall sensor 11 generates a logic high output signal H while the second hall sensor 21 generates a logic low output signal L, as represented in Table 2, in the half open state illustrated in FIG. 17

When the angle α between the first and second bodies 101 and 102 becomes 185° in a fully open state, as illustrated in FIG. 18, the distance between the first hall sensor 11 and the first magnet 12 further increases while the distance between the second hall sensor 21 and the second magnet 22 also increases. Accordingly, the first and second hall sensors 11 and 21 generate a logic high output signal H in the fully open state illustrated in FIG. 148 as represented in Table 2.

Although the mobile terminal includes a pair of sensors in the embodiments illustrated in FIGS. 12 through 19, the number or type of sensor pairs is not limited to the number or type of the sensor pairs in the embodiments illustrated in FIGS. 5 through 19. For example, the first and second bodies may include n sensor pairs in order to recognize the angle between the first and second bodies 101 and 102 by $2^n$ (n is a positive integer) stages. The hall sensors may be replaced by hall ICs, magnetoresistive elements. Furthermore, the hall sensors and the magnets may be replaced by light-receiving elements and light-emitting elements.

The present invention is not limited to the folder type mobile terminal, as described above, and can be applied to any mobile terminal having a plurality of bodies which are combined with each other in such a manner that the bodies can be relatively moved. For instance, three sensing elements 31, 32 and 22 may be included in the first body 101 of the slide type mobile terminal illustrated in FIGS. 19A, 19B and 19C and three sensed elements 41, 42 and 43 may be included in the second body 102 of the mobile terminal. In this case, the controller 180 can receive sensor outputs having different logic values depending on a variation in the extent of relative rectilinear movement of the first and second bodies 101 and 102 and respectively recognize a closed state, half open state and fully open state even in the slide type mobile terminal.

The above-described method of providing a GUI of a mobile terminal according to embodiments of the present invention can be written as computer programs and can be implemented in digital computers that execute the programs using a computer readable recording medium. The method of providing a GUI of a mobile terminal according to embodiments of the present invention can be executed through software. The software can include code segments that perform required tasks. Programs or code segments can also be stored in a processor readable medium or transmitted according to a computer data signal combined with a carrier through a transmission medium or communication network.

The computer readable recording medium is any data storage device that can store data which can be thereafter read by a computer system. Examples of the computer readable recording medium include read-only memory (ROM), random-access memory (RAM), CD-ROMs, DVD±ROM, DVD-RAM, magnetic tapes, floppy disks, optical data storage devices. The computer readable recording medium can also be distributed over network coupled computer systems so that the computer readable code is stored and executed in a distribution fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising:
a first body including a first touch screen;
a second body including a second touch screen;
a combining part coupling the first body and the second body together such that the first body and second body move relative to each other;
a sensing unit configured to sense an angle between the first body and the second body;
a memory configured to store a plurality of graphic user interfaces that each include at least one object, wherein each of the stored plurality of graphic user interfaces comprises a corresponding screen configuration that is different from screen configurations corresponding to other of the stored plurality of graphic user interfaces; and
a controller configured to:
assign priority to one of the first touch screen or second touch screen based on predetermined conditions, wherein the predetermined conditions comprise at least a direction in which each of the first touch screen and the second touch screen faces, the sensed angle between the first body and the second body, or an activation status of the first touch screen or second touch screen;

select the first touch screen or second touch screen to which priority was assigned;

select one of the graphic user interfaces of the stored plurality of graphic user interfaces based on the sensed angle; and control displaying of the selected one of the graphic user interfaces on the selected first touch screen or second touch screen, wherein each of the stored plurality of graphic user interfaces corresponds to one of a plurality of sensed angles between the first body and the second body such that a first graphic user interface of the plurality of graphic user interfaces is displayed on the selected one of the first touch screen and the second touch screen when the sensed angle is within a first range of angles, a second graphic user interface of the plurality of graphic user interfaces is displayed on the selected one of the first touch screen and the second touch screen when the sensed angle is within a second range of angles that does not overlap the first range of angles, and a third graphic user interface of the plurality of graphic user interfaces is displayed on the selected one of the first touch screen and the second touch screen when the sensed angle is within a third range of angles that does not overlap the first range of angle or the second range of angles.

2. The mobile terminal of claim 1, wherein the sensing unit is further configured to sense the direction that each of the first touch screen and second touch screen faces.

3. The mobile terminal of claim 2, wherein the controller is further configured to assign the priority to the first touch screen when the predetermined condition is the direction in which each of the first touch screen and the second touch screen faces and the sensing unit determines that the second touch screen faces downward and the first screen does not face downward.

4. The mobile terminal of claim 1, wherein the controller is further configured to:

control displaying of a first graphic user interface on the first touch screen when the sensed angle is a first angle, and control displaying of a second graphical user interface on the second touch screen when the sensed angle is a second angle different from the first angle.

5. The mobile terminal of claim 1, wherein the controller is further configured to control changing of the displayed one of the stored plurality of graphic user interfaces when the sensed angle is changed.

6. The mobile terminal of claim 1, wherein the controller is further configured to turn off the first touch screen or second touch screen when the sensed angle corresponds to a predetermined angle range.

7. The mobile terminal of claim 1, wherein the controller is further configured to control displaying of the selected one of the stored plurality of graphic user interfaces only when the sensed angle is maintained for a predetermined period of time.

8. The mobile terminal of claim 1, wherein:

the mobile terminal further comprises a first side to which the first touch screen is attached and a second side to which the second touch screen is attached;

the first side and second side do not contact each other when the first body and second body are in a closed state; and the first side and second side are arranged in substantially a same plane when the first body and second body are in a fully open state.

9. The mobile terminal of claim 1, wherein the at least one object comprises an icon or a menu corresponding to at least a file, video content, multimedia content or an application.

10. A mobile terminal, comprising:

a first body including a first touch screen;

a second body including a second touch screen;

a combining part coupling the first body and the second body together such that the first body and second body move relative to each other;

a sensing unit configured to sense a change in an angle between the first body and the second body;

a memory configured to store a plurality of graphic user interfaces that each include at least one object, wherein each of the stored plurality of graphic user interfaces comprises a corresponding screen configuration that is different from screen configurations corresponding to other of the stored plurality of graphic user interfaces; and a controller configured to:

assign priority to one of the first touch screen or second touch screen based on predetermined conditions, wherein the predetermined conditions comprise at least a direction in which each of the first touch screen and the second touch screen faces, the sensed angle between the first body and the second body, or an activation status of the first touch screen or second touch screen;

select the first touch screen or second touch screen to which priority was assigned;

select one of the graphic user interfaces of the stored plurality of graphic user interfaces based on the sensed angle change; and control displaying of the selected one of the graphic user interfaces on the selected first touch screen or second touch screen, wherein each of the stored plurality of graphic user interfaces corresponds to one of a plurality of sensed angle changes between the first body and the second body such that a first graphic user interface of the plurality of graphic user interfaces is displayed on the selected one of the first touch screen and the second touch screen when the sensed angle is within a first range of angles, a second graphic user interface of the plurality of graphic user interfaces is displayed on the selected one of the first touch screen and the second touch screen when the sensed angle is within a second range of angles that does not overlap the first range of angles, and a third graphic user interface of the plurality of graphic user interfaces is displayed on the selected one of the first touch screen and the second touch screen when the sensed angle is within a third range of angles that does not overlap the first range of angle or the second range of angles.

11. The mobile terminal of claim 10, wherein:

the sensing unit is further configured to sense the direction in which each of the first touch screen and second touch screen faces; and the controller is further configured to assign the priority to the first touch screen when the predetermined condition is the direction in which each of the first touch screen and the second touch screen faces and the sensing unit determines that the second touch screen faces downward and the first screen does not face downward.

12. The mobile terminal of claim 10, wherein the controller is further configured to control displaying of the selected one of the stored plurality of graphic user interfaces based on a first sensed angle before the sensed angle change and a second sensed angle after the sensed angle change.

13. The mobile terminal of claim 10, wherein the controller is further configured to control displaying of the selected one of the stored plurality of graphic user interfaces based on first activation states of the first touch screen and second touch screen before the sensed angle change and further based on second activation states of the first touch screen and second touch screen after the sensed angle change.

14. A method of providing a graphic user interface in a mobile terminal having a first body and a second body coupled to each other such that the first body and second body move relative to each other, the method comprising:

sensing a change in an angle between the first body and the second body;

storing a plurality of graphic user interfaces corresponding to a plurality of angle changes, wherein each of the stored plurality of graphic user interfaces includes at least one object and comprises a corresponding screen configuration that is different from screen configurations corresponding to other of the stored plurality of graphic user interfaces;

assigning priority to one of the first touch screen or second touch screen based on predetermined conditions, wherein the predetermined conditions comprise at least a direction in which each of the first touch screen and the second touch screen faces, the sensed angle between the first body and the second body, or an activation status of the first touch screen or second touch screen;

selecting the first touch screen or second touch screen to which priority was assigned, wherein the first touch screen is included in the first body and the second touch screen is included in the second body;

selecting one of the graphic user interfaces of the stored plurality of graphic user interfaces based on the sensed angle change; and controlling displaying of the selected one of the graphic user interfaces on the selected first touch screen or second touch screen, wherein a first graphic user interface of the plurality of graphic user interfaces is displayed on the selected one of the first touch screen and the second touch screen when the sensed angle is within a first range of angles, a second graphic user interface of the plurality of graphic user interfaces is displayed on the selected one of the first touch screen and the second touch screen when the sensed angle is within a second range of angles that does not overlap the first range of angles, and a third graphic user interface of the plurality of graphic user interfaces is displayed on the selected one of the first touch screen and the second touch screen when the sensed angle is within a third range of angles that does not overlap the first range of angle or the second range of angles.

15. The method of claim 14, further comprising:

sensing the direction in which each of the first touch screen and second touch screen faces; and assigning the priority to the first touch screen when the predetermined condition is the direction in which each of the first touch screen and the second touch screen faces and the second touch screen is sensed facing downward and the first screen is sensed not facing downward.

16. The method of claim 15, wherein controlling displaying of the selected one of the stored plurality of graphic user interfaces comprises:

controlling displaying of a first graphic user interface on the first touch screen; and controlling displaying of a second graphic user interface on the second touch screen.

\* \* \* \* \*